(12) United States Patent
Campos et al.

(10) Patent No.: US 11,009,006 B2
(45) Date of Patent: May 18, 2021

(54) VERTICAL-AXIS WIND TURBINE

(71) Applicant: David Favela, Sacramento, CA (US)

(72) Inventors: Sergio Favela Campos, Sacramento, CA (US); David Favela, Sacramento, CA (US)

(*) Notice: Subject to any disclaimer, the term of this patent is extended or adjusted under 35 U.S.C. 154(b) by 99 days.

(21) Appl. No.: 16/358,508

(22) Filed: Mar. 19, 2019

(65) Prior Publication Data
US 2019/0285050 A1 Sep. 19, 2019

Related U.S. Application Data

(60) Provisional application No. 62/645,118, filed on Mar. 19, 2018.

(51) Int. Cl.
| | | |
|---|---|---|
| F03D 3/06 | (2006.01) | |
| F03D 7/06 | (2006.01) | |
| F03D 3/00 | (2006.01) | |

(52) U.S. Cl.
CPC ............. *F03D 3/061* (2013.01); *F03D 3/005* (2013.01); *F03D 7/06* (2013.01); *F03D 3/065* (2013.01); *F05B 2240/21* (2013.01); *F05B 2250/232* (2013.01); *F05B 2250/35* (2013.01); *F05B 2270/20* (2013.01); *F05B 2270/321* (2013.01); *F05B 2270/402* (2013.01)

(58) Field of Classification Search
CPC ...... F03D 1/0625; F03D 1/0666; F03D 3/005; F03D 3/061; F03D 3/062; F03D 3/065; F03D 7/06; F05B 2240/9152; F05B 2240/91521; F05B 2250/232; F05B 2250/24; F05B 2250/241
See application file for complete search history.

(56) References Cited

U.S. PATENT DOCUMENTS

| | | | | |
|---|---|---|---|---|
| 752,764 | A * | 2/1904 | Dunne | F03D 9/28 417/35 |
| 4,045,147 | A * | 8/1977 | Curp | A01G 13/08 416/100 |
| 5,137,417 | A * | 8/1992 | Lund | F03D 1/06 290/44 |
| 8,277,184 | B2 * | 10/2012 | Nies | F03D 7/0204 416/9 |
| 8,487,468 | B2 * | 7/2013 | Christopher | F03B 3/12 290/54 |
| 8,882,465 | B2 * | 11/2014 | Lane | F04D 27/004 416/146 R |
| 2013/0149161 | A1 * | 6/2013 | Lacasse | F03D 1/0625 416/223 R |
| 2019/0285050 | A1 * | 9/2019 | Campos | F03D 7/06 |

* cited by examiner

*Primary Examiner* — J. Todd Newton
*Assistant Examiner* — Christopher R Legendre
(74) *Attorney, Agent, or Firm* — Perkins Coie LLP

(57) ABSTRACT

A wind turbine may include a discoidal chassis and at least one vane disposed on the discoidal chassis. The discoidal chassis can rotate about a central axis. The discoidal chassis has a first outermost surface with a pitch angle between the central axis and another axis orthogonal to the central axis. The vane is disposed on the first outermost surface. The vane has a concave surface to assist in rotation of the discoidal chassis about the central axis by harnessing wind energy.

18 Claims, 11 Drawing Sheets

VERTICAL-AXIS WIND TURBINE

CROSS-REFERENCE TO RELATED APPLICATION

This application claims priority to U.S. Provisional Patent Application Ser. No. 62/645,118, Titled "VERTICAL AXIS WIND TURBINE" and filed on Mar. 19, 2018, which is hereby incorporated by reference in its entirety.

TECHNICAL FIELD

The disclosed teachings generally relate to a wind turbine. The disclosed teachings more particularly relate to a vertical-axis wind turbine for efficiently converting fluid kinetic energy into electrical energy.

BACKGROUND

Alternative energy sources are rapidly gaining popularity. Wind energy, in particular, is an abundant source of clean energy with a positive net effect on the environment. The primary way to harness energy from the wind is a wind turbine.

A wind turbine is a system that converts kinetic energy harnessed from the wind into electrical energy. Streams of wind can strike the blades of a wind turbine, and the energy from the wind rotates the blades. The rotation of the blades generates kinetic energy that is delivered to a drivetrain, and the drivetrain can transfer this kinetic energy into electrical energy. Once generated, the electrical energy from the wind turbine can be used to power an external power source, such as a power grid, batteries, etc.

Wind turbines rotate about a rotation axis that is either horizontal or vertical. Horizontal axis wind turbines (or "HAWTs") are configured to rotate about a horizontal axis parallel with the ground. HAWTs generally include large blades that are configured to face the wind and rotate when the wind strikes the blades.

Vertical-axis wind turbines (or "VAWTs") are configured to rotate about a vertical axis that is perpendicular to the ground. Many VAWTs include a relatively lower rotational speed than HAWTs, and consequentially, VAWTs can generate greater torque.

SUMMARY

The present disclosure relates to a wind turbine. In one embodiment, a wind turbine may include a discoidal chassis and at least one vane disposed on the discoidal chassis. The discoidal chassis can rotate about a central axis. The discoidal chassis has a first outermost surface with a pitch angle between the central axis and another axis orthogonal to the central axis. The vane may be disposed on the first outermost surface. The vane has a concave surface to assist in rotation of the discoidal chassis about the central axis by harnessing wind energy.

In another embodiment, a wind turbine includes a discoidal chassis and a plurality of vanes. The discoidal chassis may be configured to rotate about a central axis. The discoidal chassis may include a first outermost surface with a pitch angle between the central axis and another axis orthogonal to the central axis. The discoidal chassis may also include a second outermost surface below the first outermost surface. The first outermost surface and the second outermost surface may form the discoidal chassis. Rotation of the discoidal chassis may be configured to obstruct at least a portion of a flow of a stream of wind at the second outermost surface to generate lift relative to the central axis. Each of the plurality of vanes may include a concave surface configured to assist in the rotation of the discoidal chassis by at least partially obstructing the flow of the stream of wind.

In another embodiment, an apparatus to harness wind energy includes a discoidal chassis, a vane, and a pivoting member engaged to the discoidal chassis. The discoidal chassis may be configured to rotate about a central axis. The discoidal chassis may include a first outermost surface with a pitch angle between the central axis and another axis orthogonal to the central axis. Vane may be disposed on the first outermost surface and the vane may form a concave surface to assist in rotating the discoidal chassis by harnessing wind energy. The pivoting member may be configured to pivot the discoidal chassis relative to a horizontal axis.

The details of one or more implementations are set forth in the accompanying attachments, the drawings, and the Detailed Description below. Other features will be apparent from the description and drawings, and from the claims.

BRIEF DESCRIPTION OF THE DRAWINGS

Various features and characteristics of the technology will become more apparent to those skilled in the art from a study of the Detailed Description in conjunction with the drawings. Embodiments of the technology are illustrated by way of example and not limitation in the drawings, in which like references may indicate similar elements.

Figure 1:
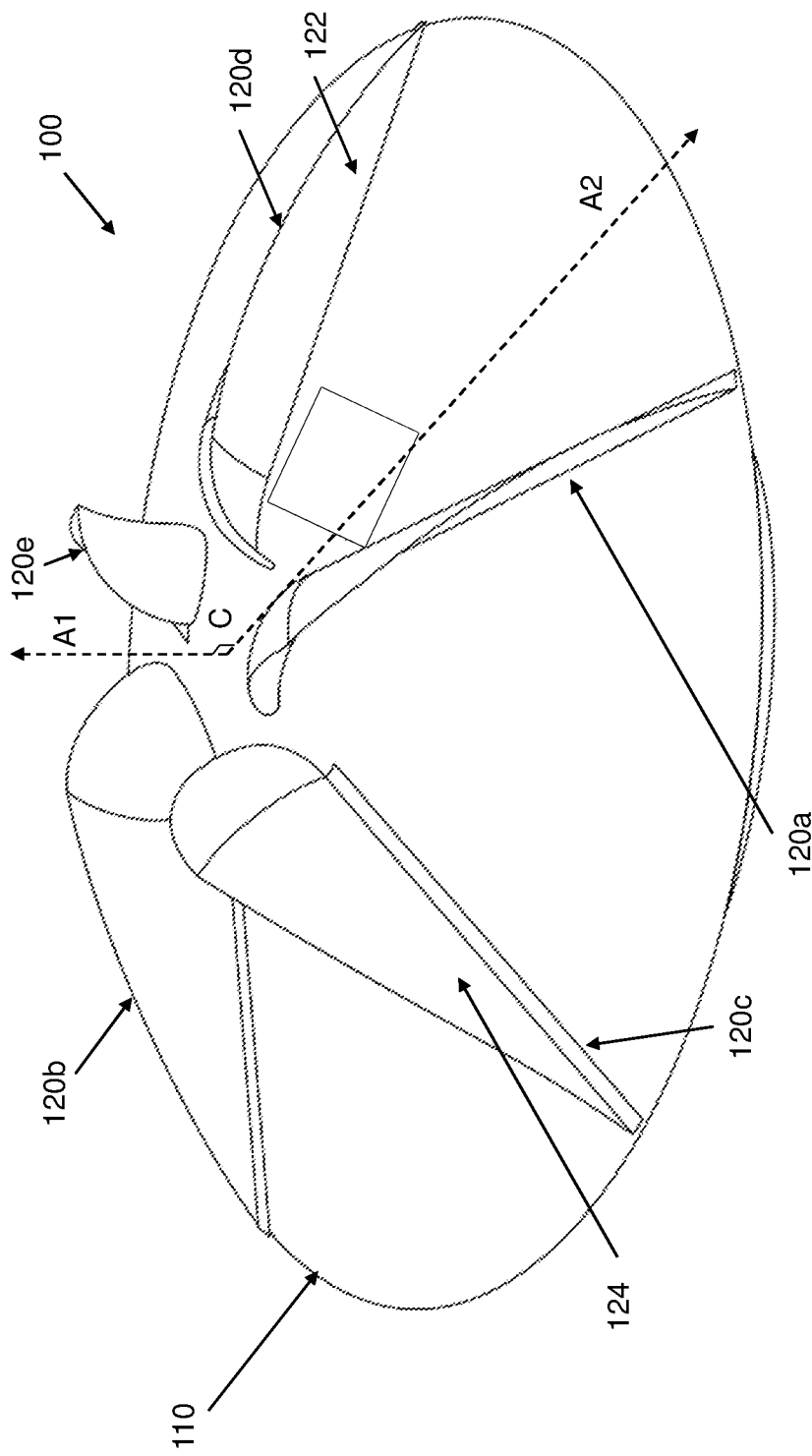
FIG. 1 illustrates a perspective view of a wind turbine, in accordance with various embodiments.

The drawings depict various embodiments for the purpose of illustration only. Those skilled in the art will recognize that alternative embodiments may be employed without departing from the principles of the technology. Accordingly, while specific embodiments are shown in the drawings, the technology is amenable to various modifications.

DETAILED DESCRIPTION

The description set forth below represents the necessary information to enable those skilled in the art to practice the embodiments and illustrate the best mode of practicing the embodiments. Upon reading the following description in light of the accompanying figures, those skilled in the art will understand the concepts of the disclosure and will recognize applications of these concepts that are not particularly addressed herein. It should be understood that these concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively.

References in this description to "an embodiment" or "one embodiment" means that the particular feature, function, structure, or characteristic being described is included in at least one embodiment. Occurrences of such phrases do not necessarily refer to the same embodiment, nor are they necessarily referring to alternative embodiments that are mutually exclusive of one another.

Unless the context clearly requires otherwise, the words "comprise" and "comprising" are to be construed in an inclusive sense rather than an exclusive or exhaustive sense (i.e., in the sense of "including but not limited to"). The terms "connected," "coupled," or any variant thereof is intended to include any connection or coupling between two or more elements, either direct or indirect. The coupling/connection can be physical, logical, or a combination thereof. For example, devices may be electrically or communicatively coupled to one another despite not sharing a physical connection.

The term "based on" is also to be construed in an inclusive sense rather than an exclusive or exhaustive sense. Thus, unless otherwise noted, the term "based on" is intended to mean "based at least in part on."

The term "module" refers broadly to software components, hardware components, firmware components, and/or combinations thereof. Modules are typically functional components that can generate useful data or other output(s) based on specified input(s). A module may be self-contained. A computer program may include one or more modules. Thus, a computer program may include multiple modules responsible for completing different tasks or a single module responsible for completing all tasks.

When used in reference to a list of multiple items, the word "or" is intended to cover all of the following interpretations: any of the items in the list, all of the items in the list, and any combination of items in the list.

The sequences of steps performed in any of the processes described here are exemplary. However, unless contrary to physical possibility, the steps may be performed in various sequences and combinations. For example, steps could be added to, or removed from, the processes described here. Similarly, steps could be replaced or reordered. Thus, descriptions of any processes are intended to be open-ended.

Overview

Wind turbines are alternative sources of electrical energy that are widely gaining popularity. Wind is abundant, renewable, and has a positive net effect on the environment. Accordingly, wind turbines can provide an intermittent source of renewable electrical energy to existing electrical power environments.

To generate electrical energy, a wind turbine harnesses the energy from the wind and converts that kinetic energy into electricity. Wind turbines include a chassis and one or more blades (or "vanes") attached to the chassis. A stream of wind can strike the blades, and the energy from the wind transfers into the blades, causing the blades to rotate around a rotation axis of the wind turbine. Based on this rotation, components of a drivetrain of the wind turbine can convert the kinetic energy generated by the rotation of the blades and chassis into electrical energy. Namely, a main rotor shaft can rotate with the chassis, delivering kinetic energy to a generator. The generator converts the kinetic energy to electrical energy, the electricity then can be transmitted to external power sources.

However, the design and functionality of many conventional wind turbines generally carry a risk of damage to components (e.g., drivetrain components, the blades) of the wind turbines. For example, many wind turbines include a drivetrain located below or subjacent to the chassis and vanes. Because of this design, many conventional wind turbine drivetrains are exposed to pressure and friction from both the weight of the chassis/vanes and the torque generated by the rotation of the chassis. The increase in pressure/friction on the drivetrain may increase risk of damage to the drivetrain components.

Additionally, many VAWTs are generally designed for lower rotational speeds, which consequentially may include greater torque. The greater torque may result in a greater energy to engage the drivetrain, and a decreased power coefficient (i.e., a measure of wind turbine efficiency in converting harnessed wind energy into electrical energy). During a cycle, many VAWT airfoils rotate 360-degrees within the wind flow, which may generate a torque that varies in magnitude (or "pulsating torque"). Such a pulsating torque may increase risk of damage to drivetrain components of the VAWT.

Further, many conventional wind turbines have lower power coefficients due to various characteristics of the wind turbines. For example, in many cases, wind turbines are designed to harvest wind energy in only a single direction. In such instances, if streams of wind strike the wind turbine from various directions, the wind turbine may be unable to harness wind energy from these streams of wind from various directions, leading to a reduced power coefficient. In addition, a stream of wind from various directions may resist the rotation of the blades in many wind turbines, which may be referred to as "striking" forces onto the wind turbine. Such striking forces may reduce the power coefficient of the wind turbines.

System Overview

The present disclosure relates to a vertical-axis wind turbine. The wind turbine includes vane(s) disposed on a discoidal chassis. The vanes are structured to harness wind energy from multiple streams of wind and with minimized aerodynamic drag. This structure maximizes the power coefficient of the wind turbine. The chassis may displace stream(s) of wind below the chassis, which generates lift of the chassis and mitigates pressure/friction on drivetrain components located subjacent to the chassis.

FIG. 1 illustrates a perspective view of a wind turbine 100, in accordance with various embodiments. The chassis 110 may be discoidal, where the chassis 110 may be referred to as a "discoidal chassis." The discoidal shape of the chassis 110 can guide a stream of wind along the chassis 110 to a concave surface 122 of vanes 120. The vane(s) 120a through 120e (also referred to collectively as "vanes 120" and individually as "vane 120") can displace the stream of wind to assist in rotation of the chassis 110. In some embodiments, the discoidal shape of the chassis 110 can facilitate rotation of the chassis 110 with a maximized power coefficient and mitigated aerodynamic drag.

As shown in FIG. 1, the chassis 110 is centered around a central axis A1 that represents the rotation axis of the chassis 110. In some embodiments, the central axis A1 of the chassis 110 may be oriented vertically. The chassis 110 may extend from the center C along an axis A2 orthogonal to the central axis A1. In operation, the chassis 110 may rotate about the central axis A1.

In the embodiment as shown in FIG. 1, multiple vanes (e.g., five vanes 120a-e) are disposed along the chassis 110. Each vane 120 has a concave surface 122 configured to trap/obstruct a stream of wind to assist in the rotation of the chassis 110. Conversely, a vane 120 has a convex surface 124 configured to obstruct a stream of wind and at least partially inhibit the rotation of the wind turbine 100. As discussed in greater detail with respect to FIG. 2, the design of the vanes 120 control/regulate the rotational speed of the wind turbine 100.

Figure 2:
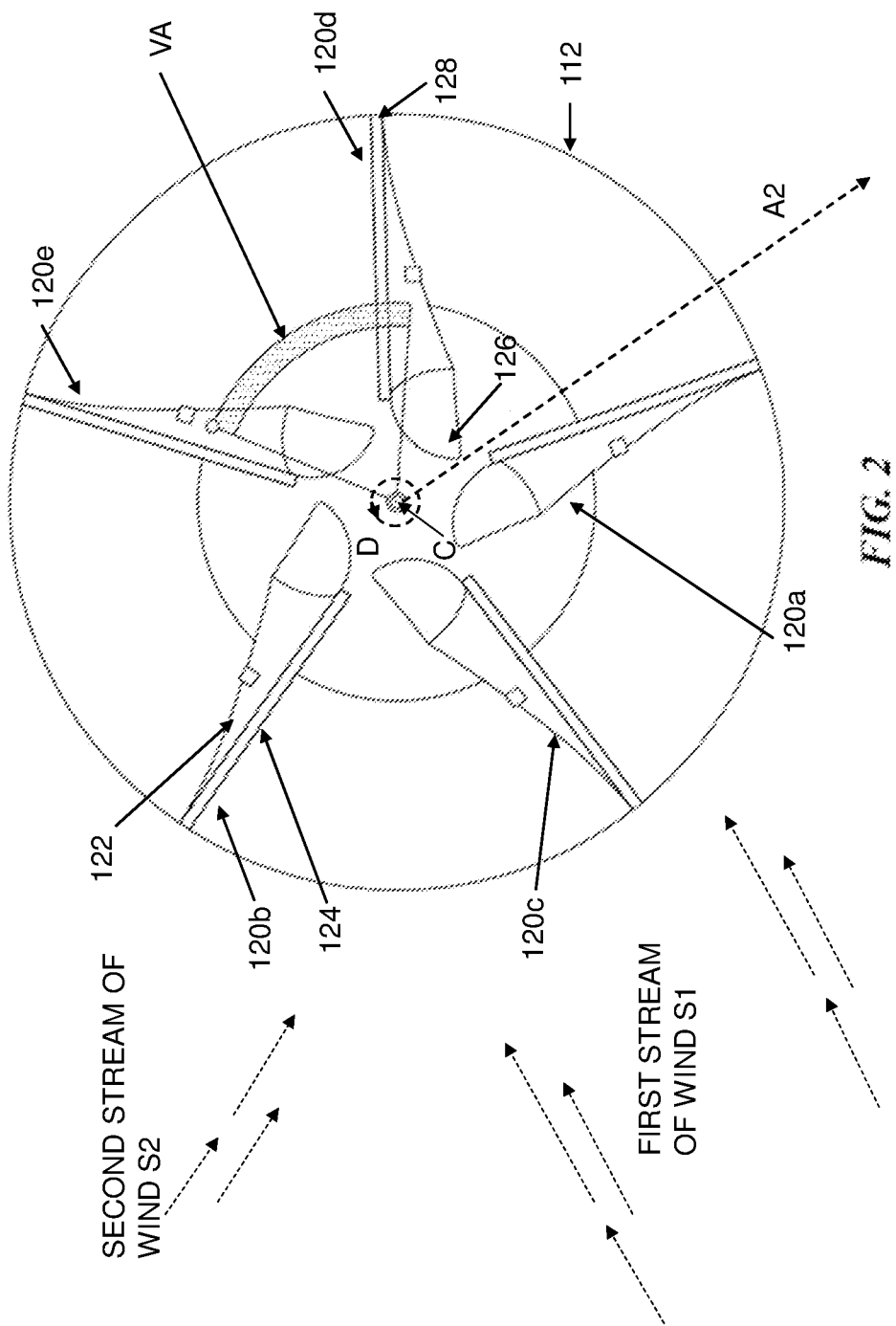
FIG. 2 illustrates a top view of a wind turbine, in accordance with various embodiments.

FIG. 2 illustrates a top view of a wind turbine 100, in accordance with various embodiments. As shown, multiple vanes 120 (e.g., five vanes) are disposed along the chassis 110. Each vane 120 extends along the chassis 110 from a first end 126 near the center C of the chassis 110 to a second end 128 near a peripheral surface 112 of the chassis 110. The peripheral surface 112 may include the outermost or edge of the chassis 110.

In the example shown in FIG. 2, five vanes 120 are disposed along the chassis 110. Each vane 120 is evenly spaced along the chassis 110. For example, each vane 120 is spaced 72 degrees from an adjacent vane 120. The angle between the adjacent vanes illustrated by VA.

The chassis 110 can rotate in a direction D, which may be either clockwise or counter-clockwise. In the embodiment shown in FIG. 2, the chassis 110 is configured to rotate counter-clockwise by harnessing energy from streams of wind.

The rotational speed of the chassis 110 may be regulated based on the orientation of the vanes 120 in relation to a flow direction of stream of winds (e.g., S1, S2). In other words, the position of the vanes 120 can prevent the chassis 110 from rotating in excess of a threshold speed, which limits the risks incurred when rotating the chassis at an excess speed.

For example, vane 120a may be disposed with its concave surface 122 oriented facing a first stream of wind S1. The first stream of wind S1 may flow into the concave surface 122 of the vane 120a, where the structure of the vane 120a obstructs the flow of the first stream of wind S1. This obstruction by the vane 120a harnesses the energy from the stream of wind S1, thereby assisting the rotation of the chassis 110 in the direction D.

In this example, the vane 120b can at least partially inhibit the rotation of the wind turbine 100. The vane 120b is disposed on the chassis 110 with a convex surface 124 oriented facing the first stream of wind S1. The convex surface 124 of the vane 120b can obstruct at least a portion of the first stream of wind S1, thereby inhibiting the rotation of the chassis 110. The other vanes 120 disposed on the chassis 110 may modify the rotational speed of the chassis 110 based on their location on the chassis 110 relative to the first stream of wind S1. Accordingly, the position of the vanes 120 can regulate the rotational speed of the chassis 110.

Many conventional wind turbines may include a braking mechanism to brake or inhibit the rotation of the blades if the rotation exceeds a threshold speed or if the wind force exceeds a threshold force. These conventional turbines may slow or stop the rotation of the blades to mitigate a risk of damage to the drivetrain components, which lowers the power coefficient of these wind turbines.

In the wind turbine 100 of the present embodiments, the structure and positioning of the vanes 120 along the chassis 110 can regulate the rotational speed of the chassis 110. Based on the position of a vane 120 on the chassis 110 with respect to a flow direction of a stream of wind, the vane 120 may either assist or inhibit the rotation of the chassis 110 about the rotation direction D. Based on this, the wind turbine 100 as presently disclosed may regulate a rotational speed of the chassis 110 without the use of a braking mechanism, thereby increasing the power coefficient of the wind turbine 100.

In some embodiments, a second stream of wind S2 with a second flow direction may be received at the wind turbine 100. In these embodiments, vane 120c may be oriented such that a concave surface 122 of the vane 120c is facing the second stream of wind S2. In this case, vane 120c may obstruct the flow of the second stream of wind S2, thereby assisting in the counter-clockwise rotation of the chassis 110.

As illustrated in FIG. 2, the wind turbine 100 can receive streams of wind (first stream of wind S1, second stream of wind S2, etc.) with multiple flow directions and harness the wind energy from each of the multiple streams of wind assist in rotating the chassis 110. Based on the configuration of the vanes 120 disposed at various positions on the chassis 110, any opposing or striking forces on the wind turbine 100 are minimized because the wind turbine 100 can harness wind energy from multiple angles.

Figure 3:
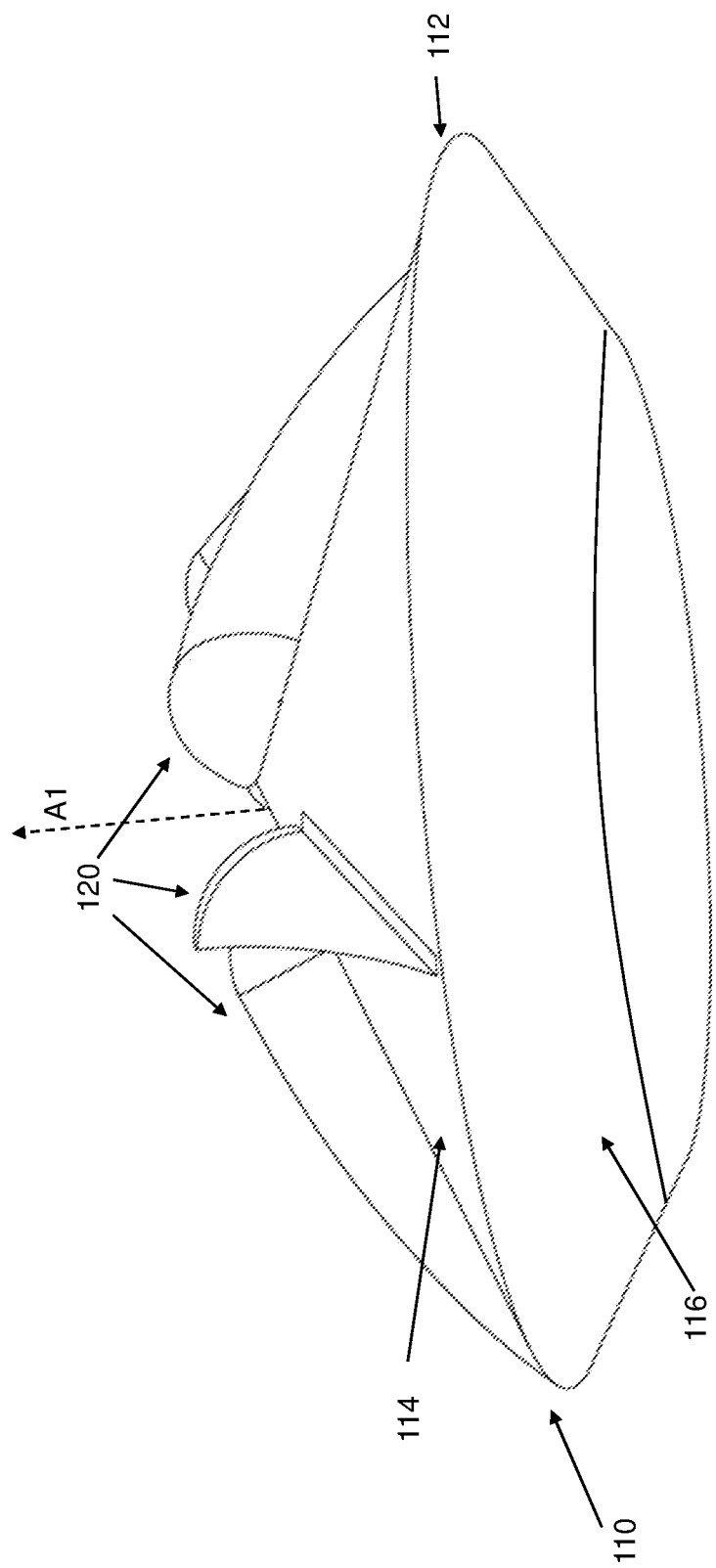
FIG. 3 illustrates a side view of the wind turbine, in accordance with various embodiments.

FIG. 3 illustrates a side view of the wind turbine 100, in accordance with various embodiments. As shown in FIG. 3, the chassis 110 includes a first surface 114 and a second surface 116. In some embodiments, the first surface and the second surface meet at the peripheral surface 112 of the chassis 110. In these embodiments, the first surface 114 and the second surface 116 collectively form a cavity within the chassis 110.

The second surface 116 may be an outermost surface of the chassis 110 disposed subjacent to the first surface 114. The second surface 116 can trap or obstruct a flow of a stream of wind. The second surface 116, while rotating about the central axis A1, can obstruct/trap a stream of wind under the second surface 116, causing aerodynamic lift of the chassis 110. Aerodynamic lift of the chassis 110 may relieve pressure and friction on the drivetrain as the chassis 110 rotates about the central axis A1.

Figure 4:
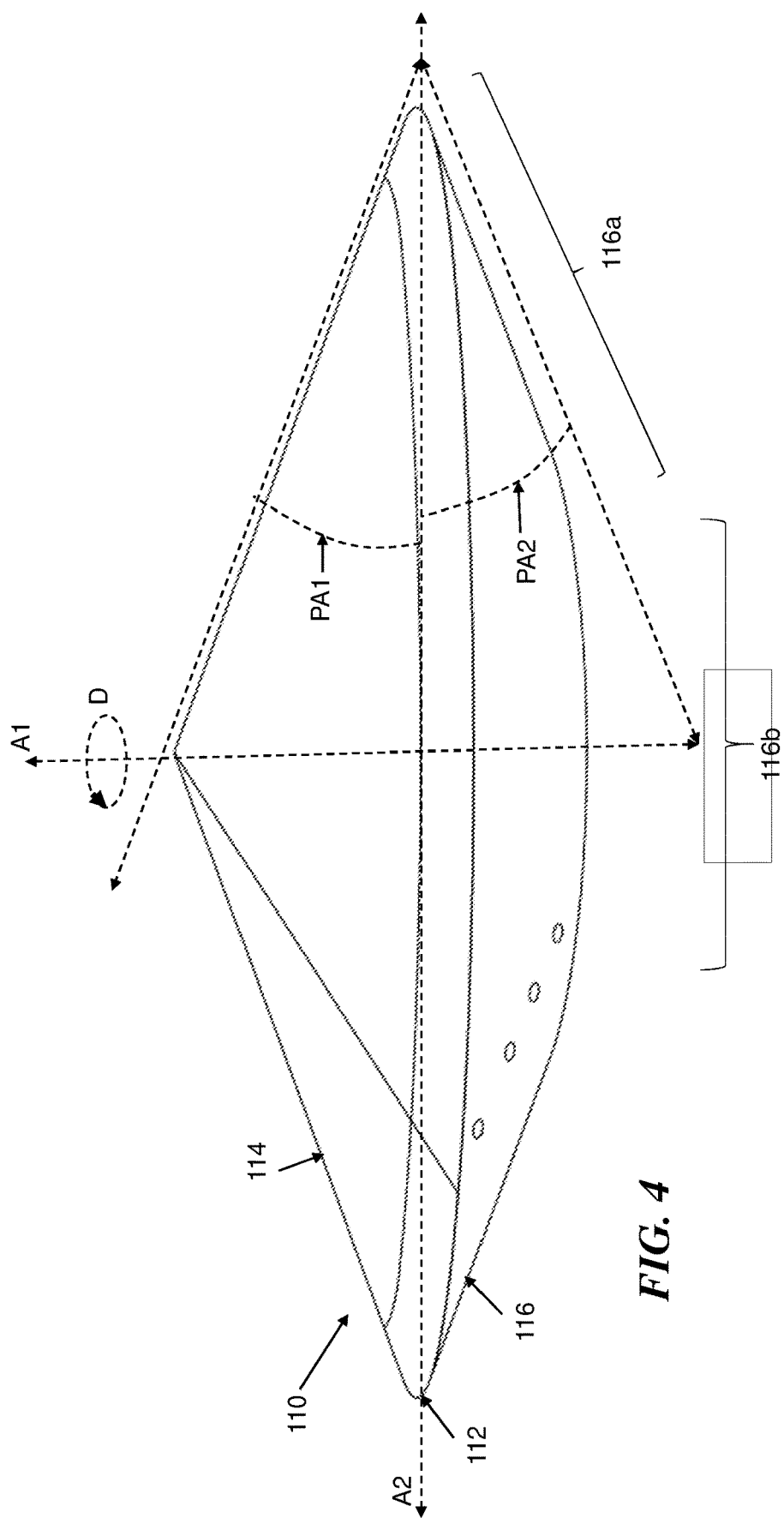
FIG. 4 illustrates a perspective view of a chassis, in accordance with various embodiments.

FIG. 4 illustrates a perspective view of a chassis 110, in accordance with various embodiments. As shown in FIG. 4, the first surface 114 may include an outermost surface of the chassis 110 that extends from the center C of the chassis 110 to a peripheral surface 112 of the chassis 110 along the second axis A2.

The first surface 114 may have a pitch angle PA1 representing a pitch of the first surface A1 from the central axis A1 to the second axis A2. In some embodiments, the pitch angle PA1 of the first surface may be 30 degrees relative to the second axis A2. In another embodiment, the pitch angle PA1 of the first surface 114 may range between 20 and 40 degrees relative to the second axis A2.

The pitch angle PA1 of the first surface 114 may increase the power coefficient of the wind turbine 100 by guiding a stream of wind up the pitched angle of the first surface 114 to the plurality of vanes 120 disposed on the chassis 110. The pitched angle PA1 may harness more wind energy of a stream of wind while minimizing aerodynamic drag.

As shown in FIG. 4, the second surface 116 has a first portion 116a and a second portion 116b. The first portion 116a extends from the peripheral surface 112 of the chassis 110 to the second portion 116b. The second portion 116b extends from the first portion 116a to the central axis A1 of the chassis 110.

In some embodiments, the first portion 116a and the second portion 116b of the second surface 116 may have different pitch angles relative to the second axis A2. For example, the pitch angle PA2 of the first portion 116a of the second surface 116 may be 30 degrees relative to the second axis A2, opposite to that of the pitch angle PA1 of the first surface 114. In another embodiment, the pitch angle PA2 of the first portion 116a may range between 20 and 40 degrees relative to the second axis A2.

The second portion 116b of the second surface 116 may be flat and parallel to the second axis A2. In an embodiment, the second portion 116b has a pitch angle that is less than 5 degrees relative to the second axis A2.

The pitch angle(s) of the second surface 116 may trap or obstruct the flow of a stream of wind. This obstruction of a stream of wind, while the wind turbine rotates about the central axis A1, may generate an amount of lift on the chassis 110. The lift may relieve at least part of the weight of the wind turbine on a drivetrain, as the gravitational forces pushing down on the drivetrain may be relieved. This lift from the drivetrain may reduce pressure and friction on the drivetrain, which may reduce damage to the drivetrain.

Figure 5:
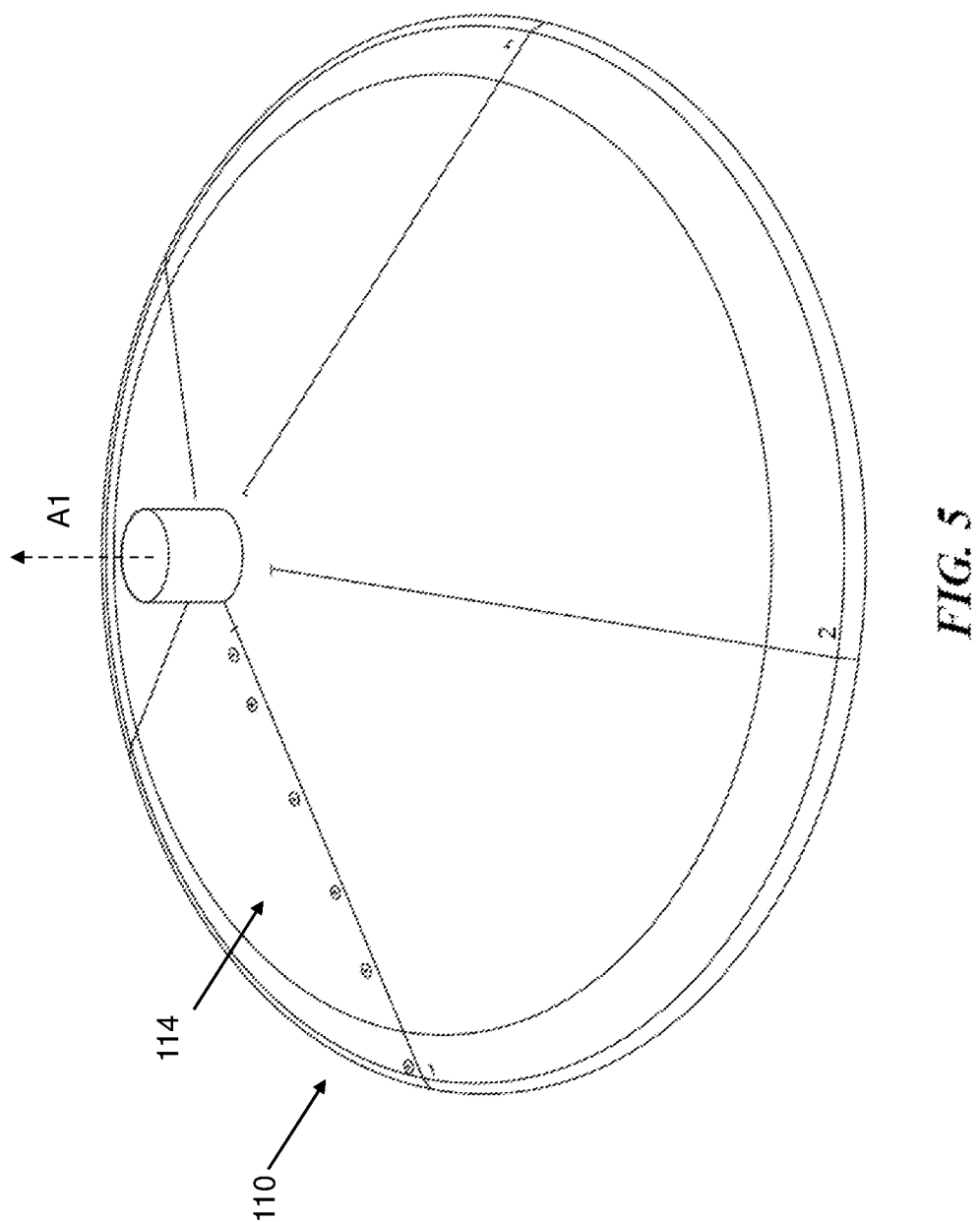
FIG. 5 illustrates a top view of a chassis, in accordance with various embodiments.

FIG. 5 illustrates a top view of a chassis 110, in accordance with various embodiments. In some embodiments, the chassis 110 is cast as a single piece in a mold. In other embodiments, the chassis 110 includes the first surface 114 that is engaged to second surface 116 to form the chassis 110. For example, the first surface 114 and second surface 116 may be engaged using an adhesive, a fastener (e.g., screws, nails), welding, etc. In an embodiment, the chassis 110 includes a metal (e.g., aluminum, steel, an aluminum alloy).

Figure 6:
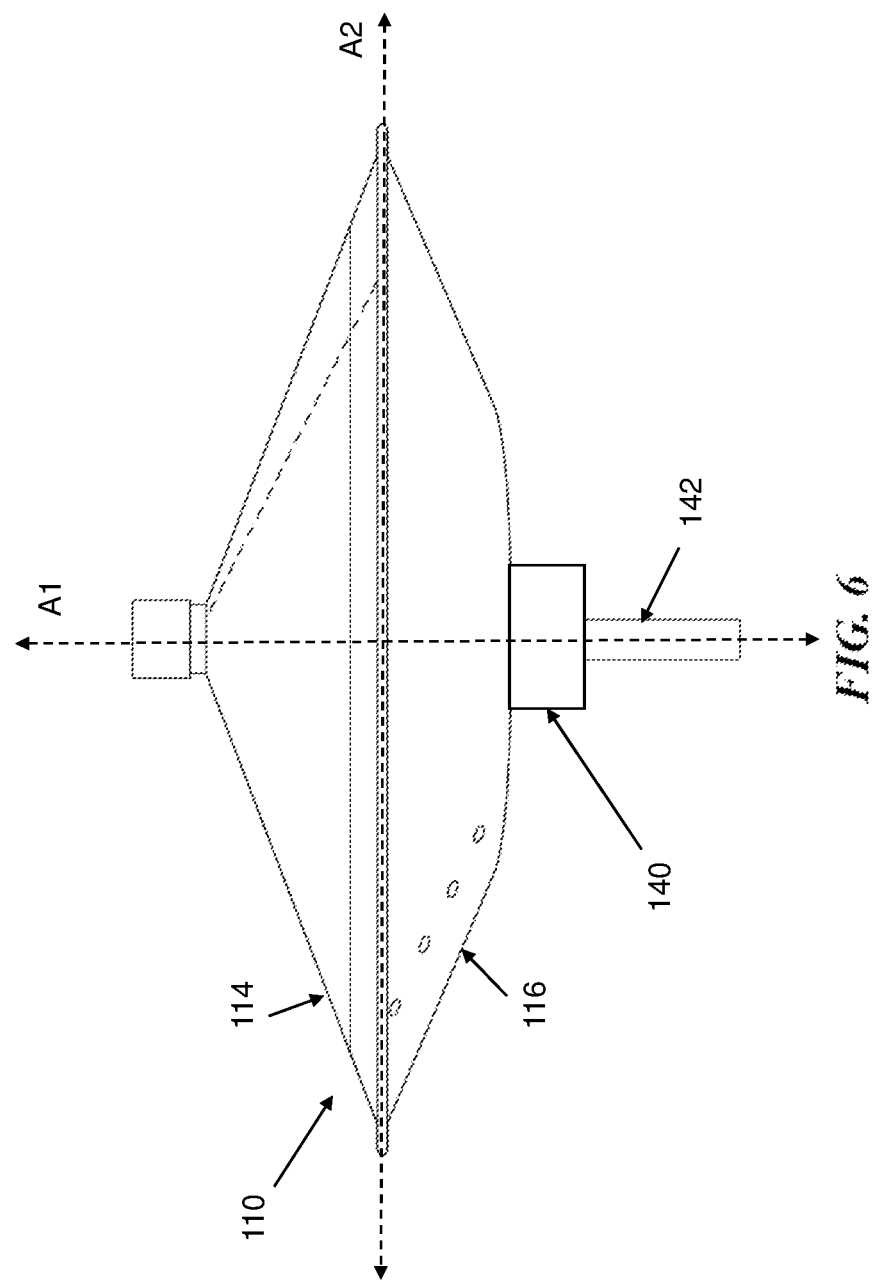
FIG. 6 illustrates a side view of the chassis and a drivetrain, in accordance with various embodiments.

FIG. 6 illustrates a side view of the chassis 110 and a drivetrain 140, in accordance with various embodiments. The drivetrain 140 may include components to facilitate the rotation of the wind turbine and generation of electrical energy. Examples of components that may be included as part of the drivetrain 140 include rotors, stators, power electronics, bearings, one or more stages of gearboxes, or a generator.

In the embodiment as shown in FIG. 6, at least some of the components of the drivetrain 140 may be disposed below the chassis 110 along the shaft 130. In some embodiments, some of the drivetrain components (e.g., generator, batteries) may be disposed at the bottom of a support structure 142 providing support for the wind turbine 100. In another embodiment, at least some of the drivetrain components (e.g., gearbox, generator) may be disposed within the cavity formed in the chassis 110.

The drivetrain 140 may include a shaft engaged to the chassis and configured to rotate about the central axis A1 upon rotation of the chassis 110. In some embodiments, the shaft is connected to a generator included as part of the drivetrain 140. The generator may be configured to convert the kinetic energy generated by the rotation of the shaft into electrical energy. The generator, in response to generating electrical energy, may transmit the electrical energy to an external source (e.g., a battery, an electronic device, an electrical power grid).

Figure 7:
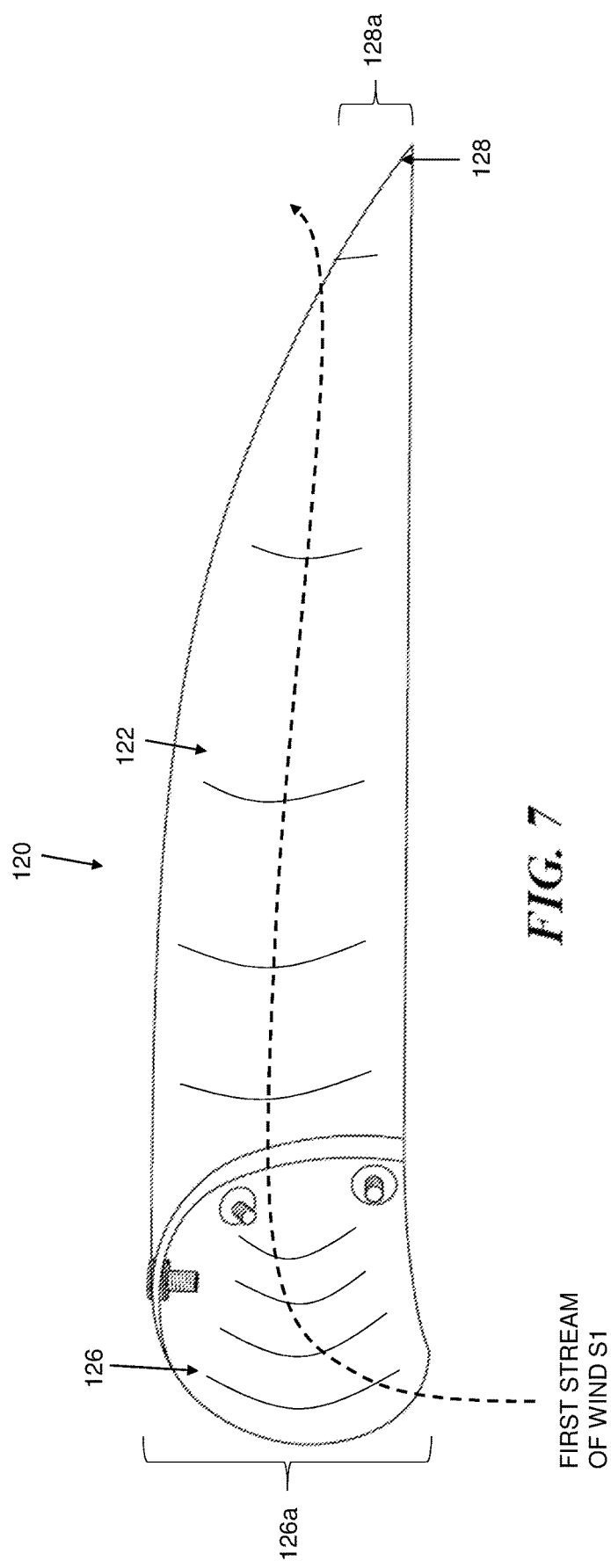
FIG. 7 illustrates a first side view of a vane, in accordance with various embodiments.

FIG. 7 illustrates a first side view of a vane 120, in accordance with various embodiments. As shown in FIG. 7, the vane 120 may include a concave surface 122. As noted above, the concave surface 122 may obstruct the flow of a stream of wind (e.g., first stream of wind S1), and assist in the rotation of a chassis.

The vane 120 may include a height that tapers from a first end 126 to a second end 128 of the vane 120. In other words, the vane may include a first height 126a at the first end 126 of the vane 120 and a second height 128a at the second end 128 of the vane 120, where the first height 126a is greater than the second height 128a. The tapering of the height of the vane 120 may increase the power coefficient by better obstructing the stream of wind at the first end 126 and allowing the stream of air to flow away from the vane 120 at the second end 128.

In some embodiments, the vane 120 may include a concavity angle (i.e., an angle representing the concavity of the vane) that decreases from the first end 126 to the second end 128. In other words, the vane 120 may include a first concavity angle at a first end 126 of the vane 120 and a second concavity angle at the second end 128 of the vane 120, where the first concavity angle is greater than the second concavity angle. In an embodiment, the first end 126 of the vane 120 may be cupped or cup-shaped.

For purposes of illustration, a flow direction of a first stream of wind S1 may be obstructed by the vane as shown in FIG. 7. In this example, the flow of the stream of wind S1 is directed into the first end 126 of the vane 120. The stream of wind S1 may be temporarily obstructed or trapped in the first end 126 of the vane 120, where this obstruction may assist in the rotation of a chassis. As the vane 120 rotates with the chassis 110, the stream of wind S1 may flow along the vane 120 towards the second end 128. At or near the second end 128 of the vane 120, the stream of wind S1 may flow from the vane 120. The tapered height of the vane 120 may assist in allowing a stream of wind (e.g., stream S1) from flowing from the vane 120 at the second end 128.

Figure 8:
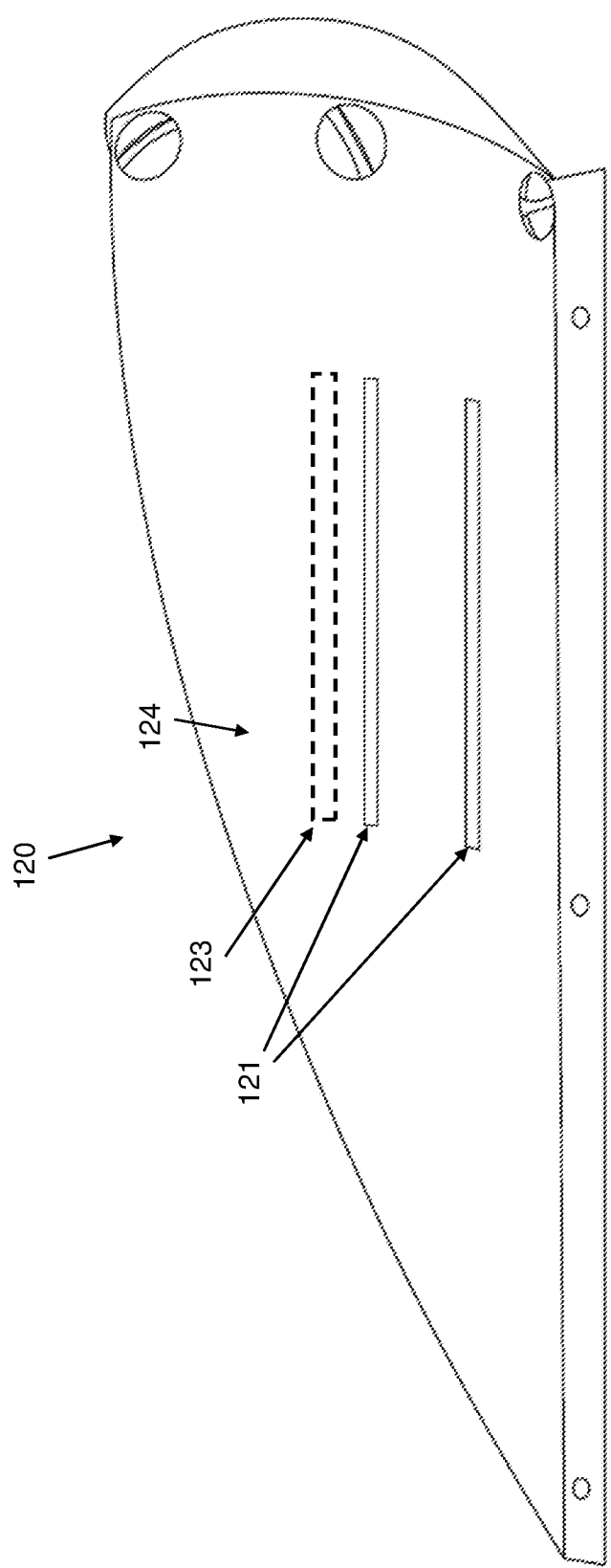
FIG. 8 illustrates a second side view of a vane, in accordance with various embodiments.

FIG. 8 illustrates a second side view of a vane 120, in accordance with various embodiments. As shown in FIG. 8, vane 120 may include a convex surface 124 with a convex angle opposite to the concave surface 122. The convex surface 124 may be configured to obstruct a flow of wind in such a way as to at least partially inhibit or lessen the rotation of the wind turbine, as discussed with respect to FIG. 2.

In some embodiments, the vane 120 may include one or more apertures 121. An aperture 121 may be formed within the vane 120 and may be configured to allow for a stream of wind to flow through the aperture 121, affecting the overall aerodynamic efficiency of the vane. In an embodiment, the aperture(s) 121 may lessen the obstruction of a stream of wind, lowering the power coefficient of the vane 120. Lowering the power coefficient of the vane 120 by use of an aperture 121 may allow for the vane 120 to regulate the rotational speed of the wind turbine, as the aperture(s) 121 may assist in regulating the rotational speed and preventing the rotational speed from exceeding a threshold speed.

In an embodiment, the vane 120 may include a detachable portion 123 configured to detach from the vane 120 when the vane 120 exceeds a threshold rotational speed. In other words, when the vane 120 exceeds a threshold speed, the detachable portion 123 may detach from the vane 120, exposing an aperture (e.g., apertures 121). Exposing an aperture 121, as noted above, may regulate the rotational speed of the wind turbine, thereby slowing the turbine below the threshold speed and reducing risk of damage to the components of the wind turbine due to high speed. The aperture(s) 121, detachable portion 123, and the design of the wind turbine 100 may all assist in regulating the rotational speed of the wind turbine, as described herein.

Figure 9:
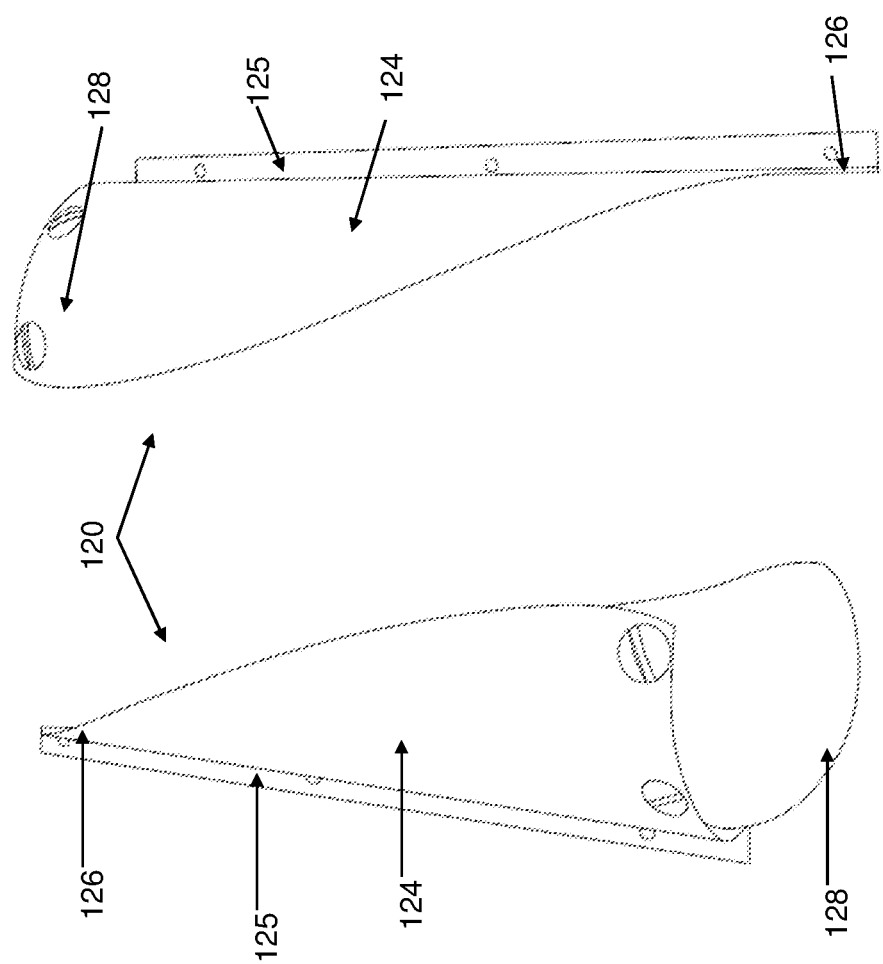
FIG. 9A illustrates a first example perspective view of a vane, in accordance with various embodiments.
FIG. 9B illustrates a second example perspective view of a vane, in accordance with various embodiments.

FIG. 9A illustrates a first example perspective view of a vane, in accordance with various embodiments. In some embodiments, the vane 120 may include a single piece formed from a mold. In other embodiments, the vane includes multiple pieces engaged by a fastening mechanism (e.g., adhesive, screw, nails). A vane 120 may be made from a metal (e.g., aluminum, steel, metal alloy) or a plastic material, for example.

FIG. 9B illustrates a second example perspective view of a vane, in accordance with various embodiments. In some embodiments, the vane 120 may include a fastening surface 125 configured to fasten the vane 120 to the chassis 110. The fastening surface 125 may be configured to rest flat along the chassis 110, providing support for the vane 120 engaged to the chassis 110. The fastening surface 125 may include openings configured to receive a fastener (e.g., screw, nail).

Figure 10:
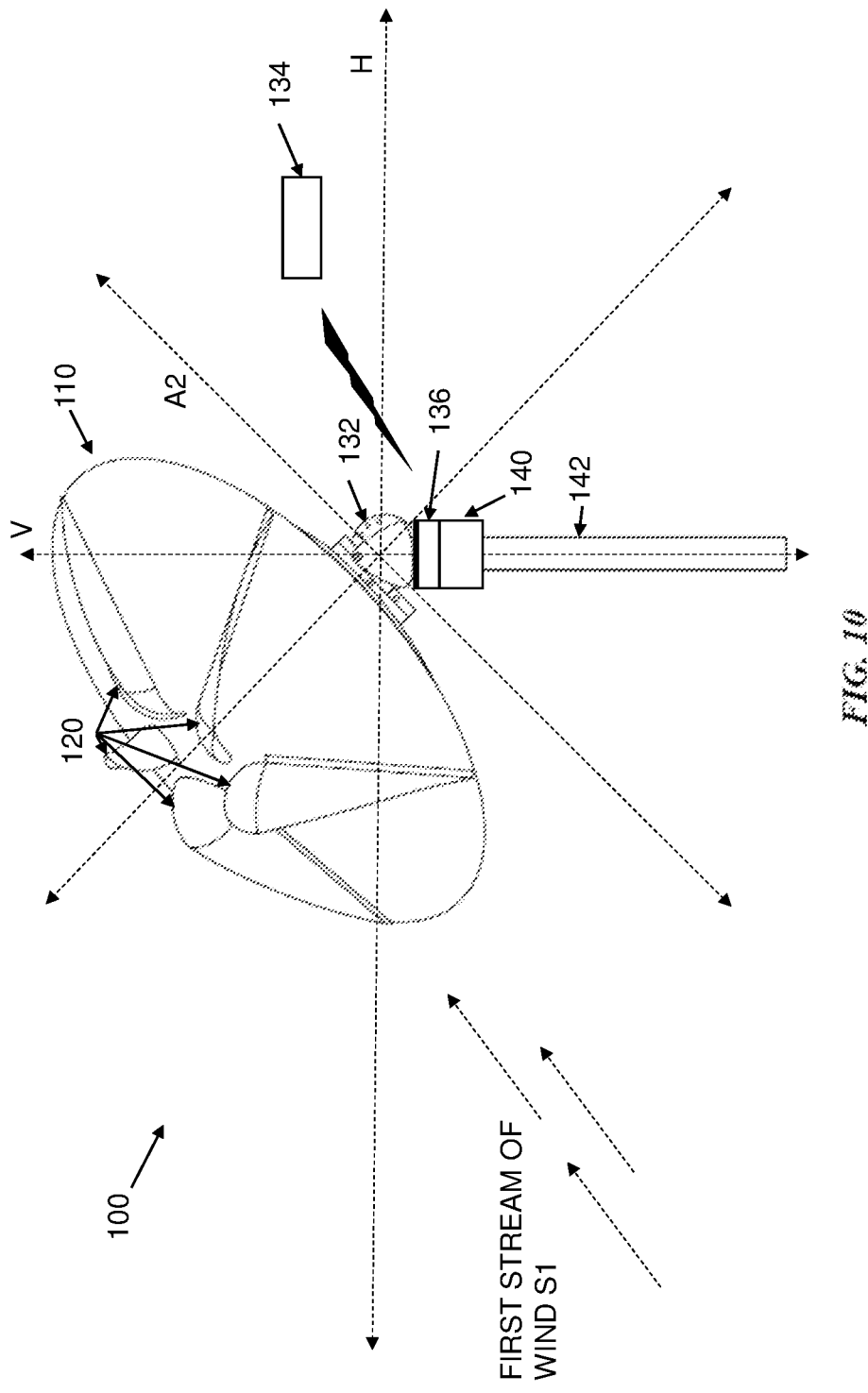
FIG. 10 illustrates a perspective view of a pivoting wind turbine, in accordance with various embodiments.

FIG. 10 illustrates a perspective view of a pivoting wind turbine, in accordance with various embodiments. As shown in FIG. 10, the chassis 110 may pivot relative to the horizontal axis H. The chassis 110 may pivot any direction relative to the horizontal axis H based on the source direction of the wind (e.g., first stream of wind S1). As an example, the chassis 110 may pivot to a first position (pivoted position at shown in FIG. 10) based on the source direction of the first stream of wind S1. In some embodiments, the chassis 110 may pivot between 0 and 45 degrees relative to a horizontal axis H. Pivoting the chassis 110 may increase the power coefficient in which the wind turbine 100 harnesses wind energy from the stream of wind S1.

The chassis 110 may pivot relative to the horizontal axis H by a pivoting member 132. The pivoting member 132 may be disposed subjacent to the chassis 110. The pivoting member 132 may include an adjustable pivot point that is configured to be modified based on the desired pivot angle of the chassis 110.

In an embodiment, the wind turbine 100 may include an electronic module 134. The electronic module 134 may be configured to detect characteristics of a stream of wind (e.g., wind speed, direction, force) using one or more sensors. As an example, the sensor(s) may identify a source direction of a first stream of wind S1 and a force of the first stream of wind S1. Based on the direction and force of the wind, the electronic module 134 may determine a pivoted position of the chassis 110 that may result in the greatest power coefficient in harnessing the wind energy. In some embodiments, the pivot angle of the wind turbine 100 may range between 0 degrees and 45 degrees relative to the horizontal axis.

For example, if a direction of a stream of wind is 12 degrees relative to the horizontal axis, the electronic module 134 may rotate the chassis 110 to an angle near or at 12 degrees relative to the horizontal axis. Rotating the chassis 110 to an angle that matches the direction of the stream of wind may increase the power coefficient of the wind turbine 100 by harnessing a greater percentage of the stream of wind.

In some embodiments, the drivetrain 140 components may include an electronic motor 136 configured to actuate the pivoting member 132 to a desired position. The electronic motor 136 may receive an instruction from the electronic module 134 instructing the electronic motor 136 to actuate the pivoting member 132 to a first position (e.g., the position of the wind turbine 100 as shown in FIG. 10). The electronic motor 136 may rotate the chassis 110 between multiple positions based on the source direction of various streams of wind.

In some embodiments, the electronic module 134 may communicate with other components (e.g., electronic motor 136) via a network interface. The network interface may enable wireless and/or wired communication between the electronics module 134 and other components of the wind turbine 100.

Figure 11:
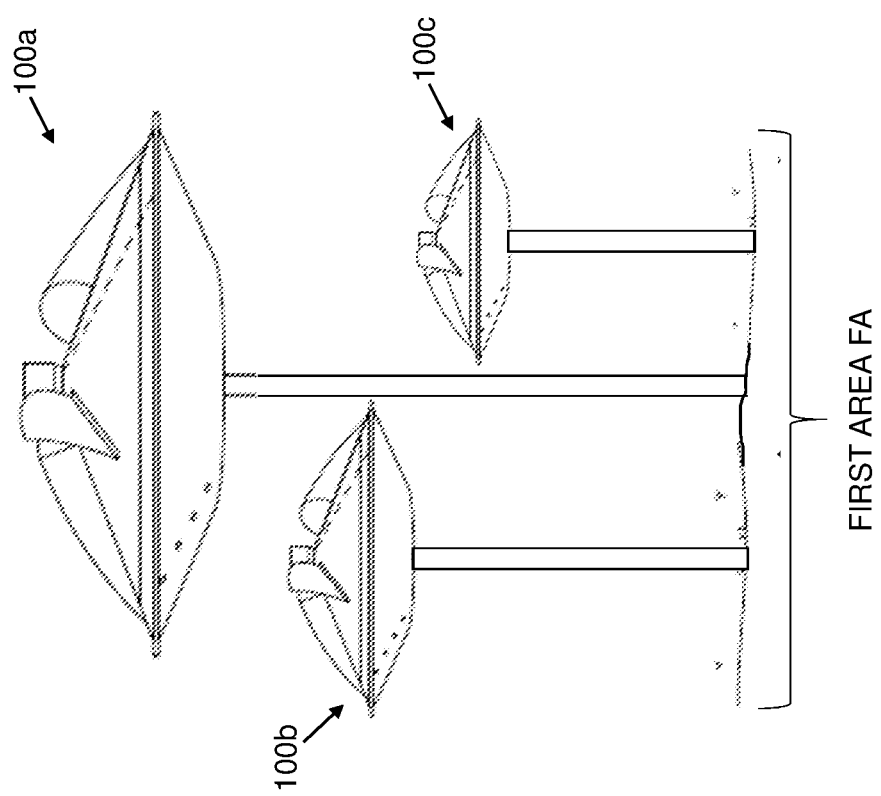
FIG. 11 illustrates a perspective view of a plurality of wind turbines 100, in accordance with various embodiments.

FIG. 11 illustrates a perspective view of a plurality of wind turbines 100, in accordance with various embodiments. In some embodiments, a plurality (or "cluster") of wind turbines may be disposed within an area (e.g., first area FA).

Many conventional wind turbines require a large surface area to safely rotate the blades of the wind turbines. For example, conventional HAWTs have a large rotation surface area to allow for the safe rotation of the blades. Further, the forces generated by blades of conventional turbines may generate a pulsating torque, which may increase the risk of damage to surrounding wind turbines. Based on this, multiple turbines may not be able to be located within a given area.

In some embodiments, the size of the discoidal chassis and vanes may be rationally proportioned. In other words, the size of the discoidal chassis and the size of each vane may be scalable based on a ratio between the size of the discoidal chassis and the size of the vane.

Accordingly, wind turbines $100a$-$100c$ including a discoidal chassis and vane(s) as disclosed herein may be scaled (or "modular") to various sizes. A cluster of various sized wind turbines 100 with sizes rationally proportioned may be included in the first area FA. As an example, the support members of each wind turbine 100 may be within 10 feet of each adjacent support member. With this, a plurality of wind turbines $100a$-$100c$ of varying size may be disposed within the first area FA.

The above Detailed Description of examples of the technology is not intended to be exhaustive or to limit the technology to the precise form disclosed above. While specific examples for the technology are described above for illustrative purposes, various equivalent modifications are possible within the scope of the technology. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

What is claimed is:

1. A wind turbine comprising:
a discoidal chassis configured to rotate about a central axis, the discoidal chassis having a first outermost surface with a first pitch angle relative to a plane orthogonal to the central axis; and
a vane disposed on the first outermost surface of the discoidal chassis and extending along the first outermost surface from a central portion of the discoidal chassis to a peripheral surface of the discoidal chassis, the vane including a concave surface configured to harness wind energy and rotate the wind turbine, and wherein a concavity of the concave surface of the vane decreases toward the peripheral surface of the discoidal chassis.

2. The wind turbine of claim 1 further comprising:
a second outermost surface subjacent to the first outermost surface, the second outermost surface configured to harness wind energy to generate lift for the wind turbine along the central axis.

3. The wind turbine of claim 2, wherein the second outermost surface comprises:
an angled portion spanning from a peripheral surface of the second outermost surface, the angled portion including a second pitch angle between 20 and 40 degrees relative to the plane orthogonal to the central axis; and
a flat portion spanning from the central axis to the angled portion of the second outermost surface, the flat portion parallel to the plane orthogonal to the central axis.

4. The wind turbine of claim 2, wherein the second outermost surface has a second pitch angle of 30 degrees relative to the plane orthogonal to the central axis, and wherein the second outermost surface is configured to generate lift upon rotation of the discoidal chassis that reduces friction between a shaft and the discoidal chassis.

5. The wind turbine of claim 1, wherein the vane is a first vane, and the wind turbine further comprises:
a plurality of vanes including the first vane, wherein each of the plurality of vanes are disposed equally spaced apart from each other on the first outermost surface of the discoidal chassis.

6. The wind turbine of claim 1, wherein the first pitch angle is between 20 and 40 degrees.

7. The wind turbine of claim 1, wherein the vane comprises:
an aperture configured to create aerodynamic drag to limit rotational speed of the wind turbine.

8. The wind turbine of claim 7, wherein the vane comprises:
a detachable portion of the vane that is detachable to expose the aperture when an angular speed of the wind turbine exceeds a threshold amount.

9. The wind turbine of claim 1 further comprising:
a shaft engaged to the discoidal chassis and configured to rotate about the central axis.

10. The wind turbine of claim 9, wherein the shaft comprises:
a pivoting member engaged to the discoidal chassis, the pivoting member being configured to pivot the discoidal chassis relative to a horizontal axis.

11. The wind turbine of claim 10, wherein the pivoting member is configured to pivot the discoidal chassis between 0 and 45 degrees relative to the horizontal axis.

12. A vertical-axis wind turbine comprising:
a discoidal chassis configured to rotate about a central axis, the discoidal chassis including:
a first outermost surface with a pitch angle relative to a plane orthogonal to the central axis; and
a second outermost surface disposed subjacent to the first outermost surface, wherein the first outermost surface and the second outermost surface form the discoidal chassis, and wherein rotation of the discoidal chassis is configured to obstruct at least a portion of a flow of a stream of wind at the second outermost surface to generate lift relative to the central axis; and
a plurality of vanes disposed on the first outermost surface of the discoidal chassis, wherein each of the plurality of vanes extends along the first outermost surface from a central portion of the discoidal chassis to a peripheral surface of the discoidal chassis and includes a concave surface configured to assist in the rotation of the discoidal chassis by at least partially obstructing the flow of the stream of wind, and wherein a concavity of the concave surface of each of the plurality of vanes decreases toward the peripheral surface of the discoidal chassis.

13. The vertical-axis wind turbine of claim 12, wherein:
the plurality of vanes is only five vanes disposed on the first outermost surface of the discoidal chassis, and
each of the five vanes are spaced 72 degrees from each adjacent vane of the plurality of vanes.

14. The vertical-axis wind turbine of claim 12, wherein each of the plurality of vanes has a first height at a first end near the central axis and a second height at a second end near the peripheral surface of the discoidal chassis, the first height being greater than the second height.

15. The vertical-axis wind turbine of claim 12, wherein each of the plurality of vanes includes a removable portion that is configured to disengage from the respective vane and expose an aperture when an angular speed of the respective vane exceeds a threshold angular speed.

16. The vertical-axis wind turbine of claim 12 further comprising:
a pivoting member engaged to the discoidal chassis, the pivoting member configured to pivot the discoidal chassis between 0 and 45 degrees relative to a horizontal axis.

17. An apparatus to harness wind energy, the apparatus comprising:
a discoidal chassis configured to rotate about a central axis, the discoidal chassis including a first outermost surface with a pitch angle relative to a plane orthogonal to the central axis;
a vane disposed on the first outermost surface, the vane extending along the first outermost surface from a central portion of the discoidal chassis to a peripheral surface of the discoidal chassis and forming a concave surface configured to assist in rotation of the discoidal chassis by harnessing wind energy, and wherein a concavity of the concave surface of the vane decreases toward the peripheral surface of the discoidal chassis; and
a pivoting member engaged to the discoidal chassis, the pivoting member configured to pivot the discoidal chassis relative to a horizontal axis.

18. The apparatus of claim 17 further comprising:
an electronic module including a sensor and an electric motor, the electronic module configured to:
receive information relating to a stream of wind from the sensor;
determine a source direction of the stream of wind based on the information relating to the stream of wind; and
transmit pivot information to the electric motor, the pivot information indicating a request to actuate the pivoting member engaged to the discoidal chassis to a first pivot position, the first pivot position associated with the source direction of the stream of wind.

* * * * *